(12) United States Patent
Kolomitsyna et al.

(10) Patent No.: US 11,085,003 B2
(45) Date of Patent: Aug. 10, 2021

(54) FUEL COMPOSITIONS BASED ON BINDERS FROM CUTIN-CONTAINING MATERIALS

(71) Applicant: REGENTS OF THE UNIVERSITY OF MINNESOTA, Minneapolis, MN (US)

(72) Inventors: Oksana Kolomitsyna, Duluth, MN (US); Matthew Young, Duluth, MN (US); Timothy Hagen, Superior, WI (US); Donald Fosnacht, Hermantown, MN (US); Eric Singsaas, Duluth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/381,726

(22) Filed: Apr. 11, 2019

(65) Prior Publication Data

US 2019/0316050 A1 Oct. 17, 2019

Related U.S. Application Data

(60) Provisional application No. 62/656,093, filed on Apr. 11, 2018.

(51) Int. Cl.
*C10L 5/04* (2006.01)
*C10L 5/36* (2006.01)
*C10L 5/14* (2006.01)

(52) U.S. Cl.
CPC ............... *C10L 5/04* (2013.01); *C10L 5/146* (2013.01); *C10L 5/361* (2013.01); *C10L 5/363* (2013.01); *C10L 2200/04* (2013.01)

(58) Field of Classification Search
CPC .. C10L 5/04; C10L 5/363; C10L 5/146; C10L 5/361; C10L 2200/04; C10L 2290/30; C10L 5/14; C10L 5/40; Y02E 50/30
See application file for complete search history.

(56) References Cited

U.S. PATENT DOCUMENTS

| | | | |
|---|---|---|---|
| 2,581,553 | A | 8/1901 | Jacquot |
| 3,517,052 | A | 6/1970 | Brandts et al. |
| 4,981,494 | A | 1/1991 | Breuil et al. |
| 6,392,070 | B1 | 5/2002 | Krasutsky et al. |
| 9,133,341 | B2 | 9/2015 | Steek et al. |

(Continued)

FOREIGN PATENT DOCUMENTS

| | | |
|---|---|---|
| EP | 2842564 A1 | 3/2015 |
| RU | 2460741 C1 | 9/2012 |

(Continued)

OTHER PUBLICATIONS

Wilen Carl et al., "Wood torrefaction—pilot tests and utilisation prospects," Energy Research Centre of the Netherlands, VTT Technology, 2013, 1-80.

(Continued)

*Primary Examiner* — Cephia D Toomer
(74) *Attorney, Agent, or Firm* — Billion & Armitage (57) ABSTRACT

Embodiments of the present disclosure describe water-resistant and durably high energy-density binder materials from cutin-containing materials, methods of making the binder materials, fuel compositions comprising the binder materials, methods of forming the fuel compositions in the form of pellets and/or briquettes, and the like.

8 Claims, 7 Drawing Sheets

(56) References Cited

U.S. PATENT DOCUMENTS

| | | | |
|---|---|---|---|
| 9,719,040 | B2 | 8/2017 | Morihara et al. |
| 9,963,600 | B2 | 5/2018 | Holmbom et al. |
| 2005/0272892 | A1 | 12/2005 | Hse et al. |
| 2008/0262190 | A1* | 10/2008 | Koskimies ............. C07C 67/03 528/271 |
| 2009/0182158 | A1 | 7/2009 | Krasutsky et al. |
| 2010/0093320 | A1 | 8/2010 | Iversen et al. |
| 2011/0302832 | A1 | 12/2011 | Arne |
| 2013/0091764 | A1 | 4/2013 | Wantling et al. |
| 2014/0199449 | A1* | 7/2014 | Hernandez ........... A23B 7/0441 426/310 |
| 2015/0203774 | A1 | 7/2015 | Lake |
| 2015/0245645 | A1 | 9/2015 | Raskin et al. |
| 2017/0049119 | A1* | 2/2017 | Perez ....................... A23B 7/16 |
| 2018/0037768 | A1 | 2/2018 | Alcantar et al. |

FOREIGN PATENT DOCUMENTS

| | | | |
|---|---|---|---|
| WO | 2007121482 | A1 | 10/2007 |
| WO | 2013059325 | A1 | 4/2013 |
| WO | 2014014910 | A1 | 1/2014 |
| WO | 2014085762 | A1 | 6/2014 |

OTHER PUBLICATIONS

Kleinschmidt Chris, "Overview of international developments in torrefaction," KEMA, Jan. 28, 2011, 1-16.

Wescott J.M. et al., "High-soy-containing water-durable adhesives," Journal of Adhesion Science and Technology, 2006, 859-873.

Brittany L. White et al., "Release of Bound Procyanidins from Cranberry Pomace by Alkaline Hydrolysis," American Chemical Society, Journal of Agricultural and Food Chemistry Article, 2010, 7572-7579.

Steven P. Crossley et al., "Novel Micropyrolyis Index (MPI) to Estimate the Sooting Tendency of Fuels," Energy & Fuels, 2008, 2455-2464.

Van V. Hoed et al., "Berry Seeds: A Source of Specialty Oils With High Content of Bioactives and Nutritional Value," Department of Organic Chemistry, 2009, 33-49.

Hawkins Wright, "Global demand for torrefied biomass could exceed 70 million tonnes a year by the end of the decade," Forest Business Network, Jan. 31, 2012, 1-2. https://www.forestbusinessnetwork.com/13392/global-demand-for-torrefied-biomass-could-exceed-70-million-tonnes-a-year-by-the-end-of-the-decade/.

Daniela Thran et al., "Global Wood Pellet Industry and Trade Study," IEA Bioenergy, Jun. 2017, 1-243.

[Online]www.crsail.org, "Torrefied Biomass," Coalition for Sustainable Rail, Jan. 17, 2018, 1-5. https://csrail.org/torrefied-biomass/.

"Bark of Coniferous trees offer an option for glue raw materials", News from Finnish Forest and Forest Sector, Apr. 2018.

Alakurtti, "Adhesives from softwood bark tannins", VTT Sustainable binders from bark, 2017.

Ekman, "The Suberin Monomers and Triterpenoids from the Outer Bark of Betula verrucosa Ehrh", Holzforschung, vol. 37, 1983, pp. 205-211.

Esteres, et al., "Adhesives from liquefied Eucalypt Bark and Branches", Wood Research, 64(1) 2019, 2019, pp. 105-116.

Heinamaki, et al., "Suberin Fatty Acids from Outer Birch Bark: Isolation and Physical Material Characterization", Journal of Natural Products, ACS Publications, vol. 80, 2017, pp. 916-924.

Hu, et al., "Effects of Binders on the Properties of Bio-Char Pellets", Applied Energy, 2015, pp. 508-516.

Kumar, et al., "Integrating Torrefaction in the Wood Pellet Industry: A Critical Review", Energy Fuels, 2017, pp. 37-54.

Peng, et al., "Sawdust as an Effective Binder for Making Torrefied Pellets", Applied Energy, 2015, pp. 491-498.

Peng, et al., "Study on Density, Hardness, and Moisture Uptake of Torrefied Wood Pellets", Energy & Fuels, vol. 27, 2013, pp. 967-974.

Penmetsa, et al., "Preliminary Findings for the Production of Water Repellent Torrefied Wood Pellets with Pyrolysis Oil", Environmental Progress & Sustainable Energy, vol. 31, Jul. 2012, pp. 235-239.

Toufiq, et al., "Engineered Pellets from Dry Torrefied and HTC Biochar Blends", Biomass and Bioenergy, vol. 63, 2014, pp. 229-238.

Toufiq, et al., "Pelletization of Biochar from Hydrothermally Carbonized Wood", Environmental Progress & Sustainable Energy, vol. 31, No. 2, Jul. 2012, pp. 225-234.

* cited by examiner

FUEL COMPOSITIONS BASED ON BINDERS FROM CUTIN-CONTAINING MATERIALS

BACKGROUND

In recent years, renewable energy sources have become increasingly more desirable and more important. To meet a growing energy demand, cellulose-containing materials have been pelletized and briquetting to provide a dense, relatively high-energy material. A desirable biomass material in development is torrefied wood. Torrefied wood is generally wood that has been heated in an absence of oxygen to remove water, organic volatiles, and a fraction of cellulose to produce a "blackened" wood chip.

Torrefied wood chips can be easily formed into high-energy, high-density pellets. However, when pellets are made from torrefied wood, most of the natural binders are burned off, producing pellets that suffer from poor water repellency. Due to these limitations, the pellets turn into a black "mud" upon exposure to water.

Another problem with torrefied wood pellets is durability. The pellets tend to create dust during mechanical processes needed to transport the pellets, such as loading and unloading of rail cars and ships. High dust fines tend to clump together, resulting in clinkering which reduces boiler efficiency due to incomplete combustion. In addition to product loss, the dust creates hazards, from inhalation, and the potential for dust explosions.

Conventional binder materials for energy pellets are limited to multi-component systems. Some binder materials, for example, are provided as two-component systems including a plasticizer and lignin. The lignin melts and flows like a binder material and assists with the pelletizing of biomass pellets. In these materials, the presence of lignin is a key factor to achieve biomass pelletizing success. However, these bio-mass pellets are neither waterproof, nor water repellant. Other multi-component systems combine lignin with other additives to improve water resistance-related properties. For example, one binder material includes a mixture of an alkaline protein hydrolysate and a bio-oil or an acidic protein hydrolysate and a lignin compound. Another binder material includes lignin, starch, calcium hydroxide, and sodium hydroxide.

Other multi-component systems may improve water resistance-related properties, but do not improve durability. For example, these binder materials contain a solubilized starch, a sugar source, and/or a diol or polyol compound and a polymer selected from polyvinyl alcohol (PVOH), PVOH copolymers, polyvinyl acetate (PVA), PVA copolymers, ethylene vinyl acetate, or any subset or combination of those polymers.

It therefore would be desirable to provide a one-component binder material for producing water-resistant and durable pellets and briquettes of torrefied wood and other fuel sources.

SUMMARY

In general, embodiments of the present disclosure describe novel binder materials from cutin-containing materials, methods of making the binder materials, fuel compositions comprising the binder materials, methods of forming the fuel compositions in the form of pellets and/or briquettes, and the like.

Embodiments of the present disclosure describe water-resistant and durable high energy-density binder materials comprising one or more of omega-hydroxy fatty acids, sterols, and waxes.

Embodiments of the present disclosure describe methods of making binder materials comprising contacting a cutin-containing material with a liquid solvent to obtain a first extract; separating the cutin-containing material from the first extract; contacting the cutin-containing material with an alkali solution to obtain a second extract including salts of one or more omega-hydroxy fatty acids; separating the second extract from at least the residual alkali, residual liquid solvent, and cutin-containing material; contacting the second extract with water and an acid to form crude precipitates; and separating the crude precipitates from at least the water and acid to obtain a binder material.

Embodiments of the present disclosure describe fuel compositions comprising pellets or briquettes of a fuel source, wherein the pellets or briquettes of the fuel source comprise: at least about 75% (w/w) fuel source; and at least about 2% to about 25% (w/w) binder material.

Embodiments of the present disclosure describe methods of making fuel compositions comprising mixing a binder material with a fuel source and water to form a mixture with a moisture content of about 20% or less, and compressing the mixture to form a fuel composition in the form of pellets or briquettes.

Embodiments of the present disclosure further describe methods of making fuel compositions comprising heating a binder material from a cutin-containing material to form a flowing binder material, mixing the flowing binder material with a fuel source and water to form a mixture, and physically processing the mixture to form pellets of the fuel source.

Embodiments of the present disclosure further describe methods of making fuel compositions comprising mixing a binder material form a cutin-containing material, fuel source, and water to form a mixture, treating the mixture to reduce a moisture content of the mixture and/or to increase a temperature of the mixture, and physically processing the mixture under pressure at a select temperature to form briquettes of the fuel source.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

The present disclosure relates to novel biomass-based binder materials derived from cutin-containing materials and improved fuel compositions based on the binder materials. The binder materials generally comprise one or more of omega-hydroxy fatty acids, sterols, and waxes. The binder materials advantageously can be easily melted under certain conditions, such as elevated temperatures and/or pressures, to form a flowing binder material and cooled to reform the binder material as a solid. In this way, the flowing binder material can be combined with any of a wide variety of fuel sources and cooled to form a protective-like coating on the fuel source, resulting in unprecedented durable, water-resistant high energy-density pellets and/or briquettes. Unlike conventional materials, the binder materials are free or substantially free of, or at least have reduced concentrations of, plasticizers, triterpenes, lignin, polymers, bio-oil, other additives, and water-repelling agents.

Definitions

The terms recited below have been defined as described below. All other terms and phrases in this disclosure shall be construed according to their ordinary meaning as understood by one of skill in the art.

As used herein, the term "cutin-containing materials" refer to any material comprising cutin. Examples of cutin-containing materials include pomaces of fruits and/or vegetables, such as cranberry pomace, apple pomace, and carrot pomace, among others.

As used herein, the term "cutin" refers to a component or main component of a plant cuticle, which is generally an extracellular layer that covers all or at least a portion of aerial surfaces of plants. In some embodiments, cutin is characterized as a waxy polymer. In some embodiments, cutin includes fatty acid-derived polymers that make up the plant cuticle. In some embodiments, cutin monomers include, but are not limited to, C16-C18 omega-hydroxy and di- and tri-carboxylic fatty acids, as well as other types of in-chain-hydroxy fatty acids, etc. Examples of cutin monomers include, but are not limited to, 16-hydroxy palmitic acid, 9,16-dihydroxypalmitic acid, 10,16-dihydroxypalmitic acid, 18-hydroxy oleic acid, 9,10-epoxy-18-hydroxy stearic acid, and 9,10,18-trihydroxystearate.

As used herein, the term "pomace" refers to any portions of plants that remain after a plant has been processed. For example, the term "pomace" can include, but is not limited to, the skins, pulps, seeds, and/or stems of plants. The term "pomace" can also include other portions of plants, such as pods, stalks, flowers, roots, leaves, and tubers. In some embodiments, the pomace includes edible portions of plants. In some embodiments, the pomace includes inedible portions of plants. Examples of typical operations in which pomace is produced include, but are not limited to, fruit or vegetable juice pressing processes, wine crushing operations, puree and concentrate operations, canning processes, and other food manufacturing processes. Examples of pomaces include cranberry pomace, apple pomace, and carrot pomace, among other types of pomaces from fruits and vegetables.

As used herein, the term "omega-hydroxy fatty acid" refers to fatty acids with a hydroxyl group at a terminal end. The term "fatty acids" include carboxylic acids with aliphatic chains, which can be saturated or unsaturated. Where the aliphatic chain of the fatty acids is unsaturated, the term "fatty acids" includes cis and trans isomers thereof. For example, the fatty acids include cis and trans isomers of unsaturated fatty acids. The aliphatic chain or tail of the fatty acids can have one or more carbons, usually at least three or more carbons.

As used herein, the term "sterol" refers to compounds comprising three cyclohexane rings in a phenanthrene arrangement with a hydroxyl group at the C3 position, a terminal cyclopentane ring, and a C8-C10 side chains at the C17 position. The sterols can be substituted or unsubstituted, aromatic or non-aromatic, saturated or unsaturated.

As used herein, the term "wax" is generally used to refer to a group of compounds that contain long-chain fatty acids esterified with a fatty alcohol. The waxes are typically about 20 to about 44 carbons in length. In some instances, the waxes can be longer than 44 carbons in length and/or shorter than about 20 carbons in length. In addition, the waxes are typically characterized by a melting point of at least about 40° C. Examples of waxes include, but are not limited to, very long-chain fatty acids, alkanes, primary and/or secondary alcohols, aldehydes, ketones, esters, and flavonoids.

As used herein, the term "triterpene" refers to a class of compounds having approximately 30 carbon atoms and synthesized from six isoprene units in plants and other organisms. Triterpenes consist of carbon, hydrogen, and optionally oxygen. Most triterpenes are secondary metabolites in plants. Most, but not all, triterpenes are pentacyclic. Examples of triterpenes include, but are not limited to, betulin, allobetulin, lupeol, friedelin, and all sterols, including lanosterol, stigmasterol, cholesterol, sitosterol, and ergosterol, among others.

As used herein, the term "sugars" refers to carbohydrates from cutin-containing materials. For example, in some embodiments, sugars include carbohydrates, such as monosaccharides and disaccharides, present in pomaces.

As used herein, the term "free" refers to a concentration of a species that includes trace amounts or less. In some embodiments, the term "free" refers to a concentration of a species that is about 1% or less, about 0.9% or less, about 0.8% or less, about 0.7% or less, about 0.6% or less, about 0.5% or less, about 0.4% or less, about 0.3% or less, about 0.2% or less, about 0.1% or less, or about 0.01% or less. As used herein, the term "substantially free" refers to a concentration of a species that is more than trace amounts. For example, in some embodiments, the term "substantially free" refers to a concentration of a species that is about 3% or less or about 2% or less.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Mixing is an example of contacting.

As used herein, "heating" refers to increasing to or at a temperature.

As used herein, "mixing" refers to contacting two or more components. For example, "mixing" may refer to bringing two or more components into physical contact, or immediate or close proximity.

As used herein, "physically processing" refers to applying one or more of pressure and temperature to form one or more of pellets and briquettes.

As used herein, "separating" refers to removing at least one component from one or more other components.

Binder Materials

Embodiments of the present disclosure describe binder materials comprising one or more of omega-hydroxy fatty acids, sterols, and waxes. In some embodiments, the binder materials comprise omega-hydroxy fatty acids, sterols, and waxes.

In some embodiments, the omega-hydroxy fatty acids include 9,10,18-trihydroxyoctadecanoic (phloionolic) acid. In some embodiments, the phloionolic acid is a major constituent of the binder material (e.g., at least about 5% to about 90% of the omega-hydroxy fatty acids or the binder material). In some embodiments, the omega-hydroxy fatty acids include one or more of phloionolic acid, 9,10-epoxy-18-hydroxyoctadecanoic acid, 18-hydroxyoctadec-9-enoic acid, 16-hydroxyhexadecanoic acid, and 9,10,12,13,18-pentahydroxyoctadecanoic acid. In some embodiments, the omega-hydroxy fatty acids include or further include one or more of 22-hydroxydocosanoic acid, docosandioic acid, and octadec-9-endioic acid. In some embodiments, the omega-hydroxy fatty acids include or further include one or more other omega-hydroxy fatty acids.

In some embodiments, the sterols include sitosterol. In some embodiments, the sterols include schottenol. In some embodiments, the sterols include sitosterol and schottenol. In some embodiments, the sterols include or further include one or more other sterols.

In some embodiments, the waxes include one or more of octacosanol, glycerol, methyl palmitate, methyl linoleate, methyl oleate, and methyl hexacosanoate. In some embodiments, the waxes include or further include one or more other waxes.

In some embodiments, the binder materials further comprise about 15% or less of triterpenes, or any increment thereof. In some embodiments, the binder materials further comprise about 15% or less, about 14% or less, about 13% or less, about 12% or less, about 11% or less, about 10% or less, about 9% or less, about 8% or less, about 7% or less, about 6% or less, about 5% or less, about 4% or less, about 3% or less, about 2% or less, or about 1% or less of triterpenes. In other embodiments, the binder materials further comprise about 0.1% to about 15% triterpenes, or any increment thereof. For example, in some embodiments, the binder materials further comprise about 10% to about 15% triterpenes. In some embodiments, the binder materials comprise about 5% to about 10% triterpenes.

In some embodiments, the triterpenes include oleanolic acid. In some embodiments, the triterpenes include ursolic acid. In some embodiments, the triterpenes include oleanolic acid and ursolic acid. In some embodiments, the triterpenes comprise other triterpenes or further comprise other triterpenes.

In some embodiments, the binder materials are free or substantially free of sugars. For example, in some embodiments, the binder materials are free or substantially free of carbohydrates. In some embodiments, the binder materials are free or substantially free of one or more of monosaccharides and disaccharides.

In some embodiments, the binder material is characterized as water-resistant. In some embodiments, the binder material is durable. In some embodiments, the binder material flows at temperatures of about 60° C. or greater. In some embodiments, the binder material is a solid or solid-like at temperatures less than about 60° C.

In certain embodiments, the binder materials include: omega-hydroxy fatty acids, wherein the omega-hydroxy fatty acids include phloionolic acid, 9,10-epoxy-18-hydroxyoctadecanoic acid, 18-hydroxyoctadec-9-enoic acid, 16-hydroxyhexadecanoic acid, and 9,10,12,13,18-pentahydroxyoctadecanoic acid; sterols, wherein the sterols include sitosterol and schottenol; waxes, wherein the waxes include octacosanol, glycerol, methyl palmitate, methyl linoleate, methyl oleate, and methyl hexacosanoate; and about 5% to about 10% of triterpenes, wherein the triterpenes include oleanolic acid and ursolic acid.

Methods of Making Binder Materials

Figure 1:
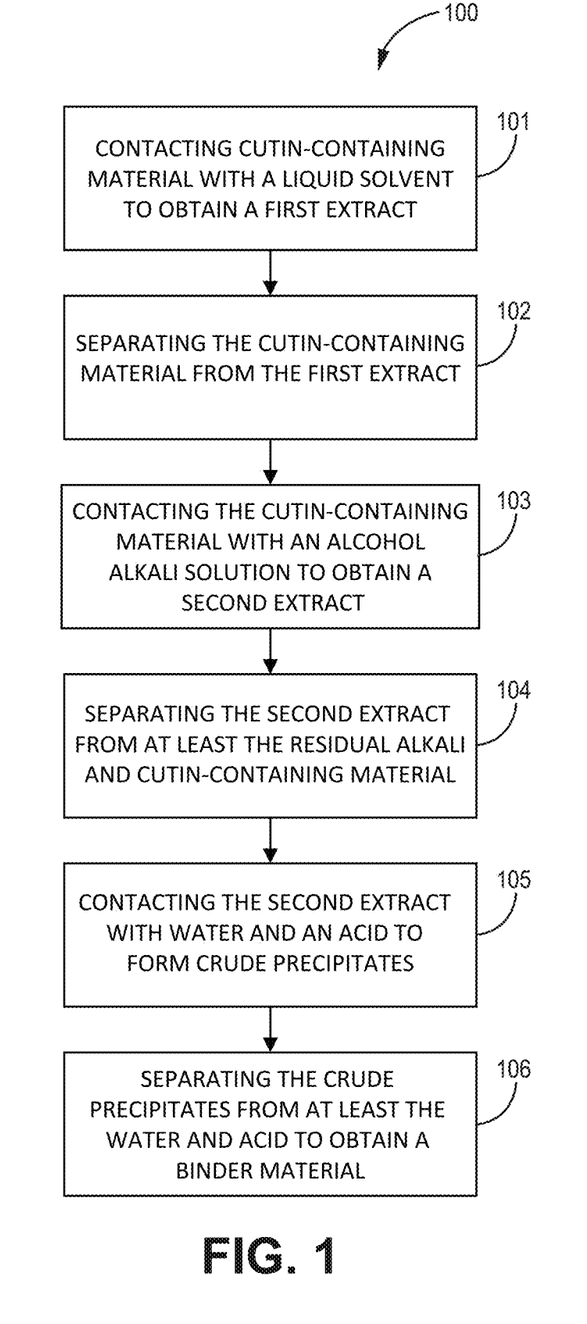
FIG. 1 is a flowchart of a method of making a binder material from cutin-containing materials, according to one or more embodiments of the present disclosure.

FIG. 1 is a flowchart of a method of making a binder material from cutin-containing materials, according to one or more embodiments of the present disclosure. As shown in FIG. 1, the method can comprise one or more of the following steps: contacting 101 a cutin-containing material with a liquid solvent to obtain a first extract; separating 102 the cutin-containing material from the first extract; contacting 103 the cutin-containing material with an alkali solution to obtain a second extract including salts of one or more omega-hydroxy fatty acids; separating 104 the second extract from at least the residual alkali, residual liquid solvent, and cutin-containing material; contacting 105 the second extract with water and an acid to form crude precipitates; and separating 106 the crude precipitates from at least the water and acid to obtain a binder material.

The step 101 includes contacting a cutin-containing material with a liquid solvent to obtain a first extract. In some embodiments, the contacting is sufficient to extract triterpenes, carbohydrates, and/or, in some instances, fatty acids other than omega-hydroxy fatty acids. In some embodiments, the contacting includes washing. For example, in some embodiments, the cutin-containing material is washed with a liquid solvent to obtain the first extract. In some embodiments, the first extract is obtained by solid-liquid extraction from the cutin-containing material. In some embodiments, the contacting proceeds at or to a temperature ranging from about 50° C. to about 150° C., or any increment thereof. In some embodiments, the contacting proceeds at or to a temperature ranging from about 60° C. to about 83° C., or any increment thereof. In some embodiments, the contacting proceeds for at least about 30 min. In some embodiments, the contacting proceeds for about 1 h to about 2 h, or any increment thereof. In some embodiments, the contacting proceeds for less than about 1 h and/or greater than about 2 h.

In some embodiments, the cutin-containing material is selected from any material comprising cutin. In some embodiments, the cutin-containing material is selected from pomace from fruits. For example, in some embodiments, the cutin-containing material is selected from cranberry pomace. In some embodiments, the cutin-containing material is selected form apple pomace. In some embodiments, the cutin-containing material is selected form pomace from vegetables. For example, in some embodiments, the cutin-containing material is selected from carrot pomace. These are provided as examples and thus shall not be limiting, as any cutin-containing material may be used herein, without departing from the scope of the present disclosure.

In some embodiments, the liquid solvent is selected from organic solvents. For example, in some embodiments, the liquid solvent is selected from methanol, ethanol, propanol, acetone, chloroform, dichloromethane, xylenes, o-dichlorobenzene (ODCB), dimethylsulfoxide (DMSO), tetrahydrofuran (THF), ethyl acetate, benzene, dimethylformamide (DMF), any derivatives thereof, and any combinations thereof. In certain embodiments, the liquid solvent is 2-propanol. These are provided as examples of liquid solvents and thus shall not be limiting, as any suitable organic solvents may be used herein, without departing from the scope of the present disclosure.

In some embodiments, a proportion of the cutin-containing material/liquid solvent is in the range of about 1/1 to about 1/25 by weight/volume (w/v), or any increment thereof. For example, in some embodiments, a proportion of the cutin-containing material/liquid solvent is in the range of about 1/5 to about 1/10 (w/v). In some embodiments, a proportion of the cutin-containing material/liquid solvent is about 1/5 (w/v). In some embodiments, a proportion of the cutin-containing material/liquid solvent is about 1/6 (w/v). In some embodiments, a proportion of the cutin-containing material/liquid solvent is about 1/7 (w/v). In some embodiments, a proportion of the cutin-containing material/liquid solvent is about 1/8 (w/v). In some embodiments, a proportion of the cutin-containing material/liquid solvent is about 1/9 (w/v). In some embodiments, a proportion of the cutin-containing material/liquid solvent is about 1/10 (w/v).

The step 102 includes separating the cutin-containing material from the first extract. In some embodiments, the cutin-containing material is referred to as a spent cutin-containing material (e.g., any cutin-containing material subjected to step 101 or extraction processes, such as solid-liquid extraction). In some embodiments, the separating includes hot filtration, evaporation, or combinations thereof. In some embodiments, the separating includes hot filtration. In some embodiments, the separating includes vacuum evaporation. In some embodiments, the separating includes vacuum evaporation at or to a temperature of about 120° C. or less. These techniques are provided as examples and thus shall not be limiting, as any suitable technique for separating the cutin-containing material from the first extract may be used herein without departing from the scope of the present disclosure.

In some embodiments, the cutin-containing material is separated or further separated from other components remaining after step 101. For example, in some embodiments, the cutin-containing material is separated or further separated from any components involved in and/or remaining after step 101 or solid-liquid extraction. In some embodiments, the other components include residual liquid solvent and solids. In some embodiments, the separating produces a volume of the first extract in the range of about 5% to about 15% of the volume of the initial mash. In some embodiments, the separating produces a volume of the first extract in the range of about 8% to about 12% of the volume of the initial mass. In other embodiments, the separating produces a volume of the first extract that is less than about 5% and/or greater than about 15% of the volume of the initial mass.

The step 103 includes contacting the cutin-containing material with an alkali solution to obtain a second extract including salts of one or more omega-hydroxy fatty acids. In some embodiments, the cutin-containing material is a cutin-containing material free from the first extract. In some embodiments, the cutin-containing material is added to an alkali solution and undergoes hydrolysis with an alkali (e.g., alkali hydrolysis) to form salts of omega-hydroxy fatty acids. In some embodiments, the contacting proceeds at or to a temperature in the range of about 50° C. to about 150° C. In some embodiments, the contacting proceeds at or to a temperature in the range of about 60° C. to about 83° C. In some embodiments, the contacting proceeds for a duration of about 1 h to about 3 h. In some embodiments, the contacting proceeds for less than about 1 hour or greater than about 3 hours.

In some embodiments, the alkali solution includes an alkali and one or more solvents. For example, in some embodiments, the alkali solution is formed from an aqueous alkali solution and an organic solvent. In some embodiments, the alkali solution is formed from an alkali and an organic solvent, with at least a small amount of water present. In some embodiments, the alkali solution includes about 95% organic solvent, with the remaining 5% balance including one or more of alkali and aqueous alkali solution. In some embodiments, the alkali solution includes more than about 95% organic solvent or less than about 95% organic solvent, with the remaining balance including one or more of alkali and aqueous alkali solution. In some embodiments, the alkali is selected from lithium, sodium, potassium, rubidium, caesium, francium, and combinations thereof. For example, in some embodiments, the alkali solution comprises one or more of NaOH and KOH, among others. In some embodiments, the alkali solution comprises one or more of methanol, ethanol, 1-propanol, and 2-propanol, among others. In some embodiments, the alkali solution is an aqueous solution of NaOH and an organic solvent, which can be any of the organic solvents of the present disclosure. For example, in some embodiments, the alkali solution is an aqueous solution of NaOH and 2-propanol.

In some embodiments, a proportion of the cutin-containing material (e.g., the cutin-containing material free from the first extract) to the alkali solution or solvent is in the range of about 1/1 to about 30/1 (w/v), or any increment thereof. In some embodiments, a proportion of the cutin-containing material (e.g., the cutin-containing material free from the first extract) to the alkali solution is in the range of about 6/1 to about 15/1 (w/v), or any increment thereof. For example, in some embodiments, a proportion of the cutin-containing material (e.g., the cutin-containing material free from the first extract) to the alkali solution is about 6/1 (w/v). In some embodiments, a proportion of the cutin-containing material (e.g., the cutin-containing material free from the first extract) to the alkali solution is about 7/1 (w/v). In some embodiments, a proportion of the cutin-containing material (e.g., the cutin-containing material free from the first extract) to the alkali solution is about 8/1 (w/v). In some embodiments, a proportion of the cutin-containing material (e.g., the cutin-containing material free from the first extract) to the alkali solution is about 9/1 (w/v). In some embodiments, a proportion of the cutin-containing material (e.g., the cutin-containing material free from the first extract) to the alkali solution is about 10/1 (w/v). In some embodiments, a proportion of the cutin-containing material (e.g., the cutin-containing material free from the first extract) to the alkali solution is about 11/1 (w/v). In some embodiments, a proportion of the cutin-containing material (e.g., the cutin-containing material free from the first extract) to the alkali solution is about 12/1 (w/v). In some embodiments, a proportion of the cutin-containing material (e.g., the cutin-containing material free from the first extract) to the alkali solution is about 13/1 (w/v). In some embodiments, a proportion of the cutin-containing material (e.g., the cutin-containing material free from the first extract) to the alkali solution is about 14/1 (w/v). In some embodiments, a proportion of the cutin-containing material (e.g., the cutin-containing material free from the first extract) to the alkali solution is about 15/1 (w/v).

The step 104 includes separating the second extract from the components involved in and/or remaining after alkali hydrolysis. In some embodiments, the second extract is separated from residual components to obtain, for example, a second extract free from the residual components and including one or more omega-hydroxy fatty acids. In some embodiments, the residual components include one or more of residual liquid solvent, residual alkali, residual and/or spent cutin-containing material, and any other residual liquids and/or solids. In some embodiments, the second extract free from residual components and including salts of one or more omega-hydroxy fatty acids is in the form of a solid.

In some embodiments, the separating includes hot filtration, refluxing, evaporation, or combinations thereof. For example, in some embodiments, the separating includes hot filtration. In some embodiments, optionally after hot filtration, the separating includes contacting the second extract with an organic solvent and refluxing for a select duration. In some embodiments, the organic solvent is selected from any of the organic solvents of the present disclosure. For example, in some embodiments, the organic solvent is 2-propanol. In some embodiments, the select duration of the refluxing is in the range of about 0.1 h to about 1. In other embodiments, the select duration of the refluxing is less than about 0.1 h and/or greater than about 1 h. In some embodiments, a proportion of the cutin-containing material to organic solvent is in the range of about 1/5 to about 1/10 (w/v). In some embodiments, optionally after refluxing, the separating includes vacuum evaporation. For example, in some embodiments, the vacuum evaporation proceeds at or to a temperature of about 120° C. or less. In some embodiments, the vacuum filtration proceeds at or to a temperature of about 60° C. or less. In other embodiments, techniques other than hot filtration, refluxing, and evaporation are used for the separating.

The step 105 includes contacting the second extract, which includes second extracts from step 103 or step 104, with water and an acid sufficient to form a crude precipitate or crude precipitates. In some embodiments, the contacting proceeds to or at about room temperature. In some embodiments, the contacting includes contacting the second extract with water and subsequently contacting the second extract with the acid. For example, in some embodiments, the contacting proceeds first with water to dissolve the second extract and subsequently proceeds with the acid to obtain crude precipitates. In some embodiments, the contacting with water proceeds under stirring for a select duration to dissolve the second extract. In some embodiments, the select duration is in the range of about 1 min to about 1 h. In some embodiments, the select duration is in the range of about 30 min. In other embodiments, the contacting includes contacting the second extract with the acid and subsequently contacting the second extract with water. In other embodiments, the contacting includes contacting the second extract with water and the acid at about the same time or simultaneously.

In some embodiments, the acid is selected from any acid suitable for acidifying, for example, the aqueous solution of the second extract. The acids thus are not particularly limited. In some embodiments, the acid is HCl, such as 10% HCl. In some embodiments, the acid is used to adjust a pH of the aqueous solution of the second extract to a pH in the range of about 3 to about 6. In some embodiments, the pH of the solution is adjusted to about 4 to about 5.

The step 106 includes separating the crude precipitates from at least the water and acids to obtain a binder material. In some embodiments, the separating includes centrifuging to separate the crude precipitates from at least the water and acids present in step 105. In some embodiments, optionally after centrifuging, the crude precipitates are washed with water, filtered off, and dried to obtain the binder material. In some embodiments, the binder material is any of the binder materials of the present disclosure. For example, in some embodiments, the binder material includes one or more of omega-hydroxy fatty acids, sterols, and waxes. In some embodiments, the binder materials are water-resistant, durable, or both water-resistant and durable. In some embodiments, the volume of the binder material so obtained is in the range of about 5% to about 15% of the volume of the initial mass.

Fuel Compositions

Embodiments of the present disclosure describe fuel compositions. In some embodiments, the fuel compositions comprise pellets or briquettes of a fuel source, wherein the pellets or briquettes of the fuel source comprise: at least about 75% (w/w) fuel source; and at least about 2% to about 25% (w/w) binder material. Any of the binder materials of the present disclosure can be used herein. For example, in some embodiments, the binder material is a mixture comprising one or more of omega-hydroxy fatty acids, sterols, and waxes. In some embodiments, the fuel composition is water-resistant. In some embodiments, the fuel composition is durable. In some embodiments, the fuel composition is water-resistant and durable.

In some embodiments, the fuel source is selected from biomasses, minerals and/or fertilizer agglomerate bindings, carbonized materials, and combinations thereof. In some embodiments, the biomasses are selected from white woods, agricultural waste streams, grasses, bagasse waste, forest and/or logging residues, and barks. Examples of white woods include, but are not limited to, softwoods and hardwoods. Examples of agricultural waste streams include, but are not limited to straws, stovers, etc. In certain embodiments, the fuel source is torrefied wood. In some embodiments, the minerals and/or fertilizer agglomerate bindings include gypsum. In some embodiments, the carbonized materials are selected from torrefied woods, bio chars, activated carbons and granulized carbon powders from hydrothermal carbonizations. These are provided as examples and thus shall not be limiting as other fuel sources may be used herein without departing from the scope of the present disclosure.

Methods of Making Fuel Compositions

Figure 2:
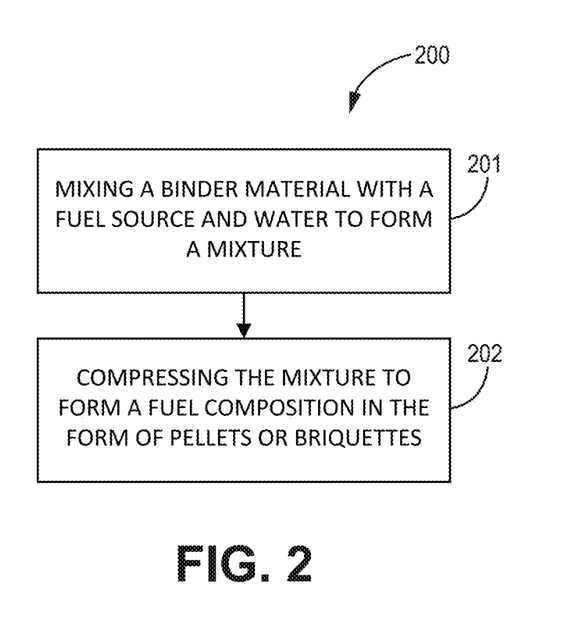
FIG. 2 is a flowchart of a method of making a fuel composition, according to one or more embodiments of the present disclosure.

FIG. 2 is a flowchart of a method of making a fuel composition, according to one or more embodiments of the present disclosure. As shown in FIG. 2, the method comprises one or more of the following steps: mixing 201 a binder material with a fuel source and water to form a mixture with a moisture content of about 20% or less, and compressing 202 the mixture to form a fuel composition in the form of pellets or briquettes.

The step 201 includes mixing a binder material with a fuel source and water to form a mixture with a moisture content of about 20% or less. The binder materials of the present disclosure may be used herein. For example, in some embodiments, the binder materials are binder materials from cutin-containing materials. In some embodiments, the binder materials include a mixture of omega-hydroxy fatty acids, sterols, and waxes. In some embodiments, the binder materials include omega-hydroxy fatty acids, sterols, waxes, and about 15% or less of triterpenes. In certain embodiments, the binder materials include: omega-hydroxy fatty acids, wherein the omega-hydroxy fatty acids include phloionolic acid, 9,10-epoxy-18-hydroxyoctadecanoic acid, 18-hydroxyoctadec-9-enoic acid, 16-hydroxyhexadecanoic acid, and 9,10,12,13,18-pentahydroxyoctadecanoic acid; sterols, wherein the sterols include sitosterol and schottenol; waxes, wherein the waxes include octacosanol, glycerol, methyl palmitate, methyl linoleate, methyl oleate, and methyl hexacosanoate; and about 5% to about 10% of triterpenes, wherein the triterpenes include oleanolic acid and ursolic acid.

In some embodiments, the fuel source is selected from biomasses, minerals and/or fertilizer agglomerate bindings, carbonized materials, and combinations thereof. In some embodiments, the biomasses are selected from white woods, agricultural waste streams, grasses, bagasse waste, forest and/or logging residues, and barks. Examples of white woods include, but are not limited to, softwoods and hardwoods. Examples of agricultural waste streams include, but are not limited to straws, stovers, etc. In certain embodiments, the fuel source is torrefied wood. In some embodiments, the minerals and/or fertilizer agglomerate bindings include gypsum. In some embodiments, the carbonized materials are selected from torrefied woods, bio chars, activated carbons and granulized carbon powders from hydrothermal carbonizations. These are provided as examples and thus shall not be limiting as other fuel sources may be used herein without departing from the scope of the present disclosure.

In some embodiments, the mixture of the binder material, fuel source, and water has a moisture content of about 20% or less. For example, in some embodiments, the mixture has a moisture content of about 15% or less. In some embodiments, the mixture has a moisture content of about 10% or less. In other embodiments, the mixture has a moisture content in the range of about 1% to about 25%, or any increment thereof. For example, in some embodiments, the mixture has a moisture content in the range of about 15% to about 25%. In some embodiments, the mixture has a moisture content in the range of about 10% to about 20%. In some embodiments, the mixture has a moisture content in the range of about 10% to about 15%. In some embodiments, the mixture has a moisture content in the range of about 5% to about 20%. In some embodiments, the mixture has a moisture content in the range of about 5% to about 15%. In some embodiments, the mixture has a moisture content in the range of about 5% to about 10%. In some embodiments, the mixture has a moisture content in the range of about 5% to about 25%.

The step 202 includes compressing the mixture to form a fuel composition, wherein the fuel composition includes pellets of the fuel source or briquettes of the fuel source. In some embodiments, the compressing comprises extruding or pressing the mixture through a die to form pellets of the fuel source. In some embodiments, the compressing comprises mixing at or to a select temperature and pressure. In some embodiments, the select temperature is in the range of about 10° C. to about 50° C., or any increment thereof. For example, in some embodiments, the select temperature is less than about 35° C. In some embodiments, the select temperature is in the range of about 20° C. to about 25° C. In some embodiments, the select temperature is in the range of about 20° C. to about 22° C. In some embodiments, the select temperature is at least about 200° C. For example, in some embodiments, the select temperature is about 260° C. or greater. In some embodiments, the select pressure is in the range of about atmospheric pressure to about 30,000 psi, or any increment thereof. In some embodiments, the select pressure is in the range of about 10,000 psi to about 20,000 psi. In some embodiments, the select pressure is in the range of about 14,000 psi to about 16,000 psi. In some embodiments, the select pressure is about 14,700 psi (e.g., 14,793 psi).

In some embodiments, the compressing is used to form a flowing binder material. For example, in some embodiments, the select temperature, select pressure, or a combination of the select temperature and select pressure are suitable to reduce a viscosity of the binder material such that the binder material melts to form a flowing binder material. In other embodiments, the binder material is optionally heated prior to the mixing to reduce a viscosity of the binder material and form a flowing binder material. For example, in some embodiments, the binder material is heated to at least about 60° C. or higher.

In some embodiments, a flowing binder material allows the binder material to coat or cover the fuel source during the compressing at the select temperature and/or select pressure. In some embodiments, by heating the binder material prior to the mixing, a flowing binder material can be mixed with the fuel source and water to coat or cover the fuel source. In some embodiments, after the compressing, the binder material is cooled such that it reforms as a solid coating that covers all or at least a portion of the fuel source.

Figure 3:
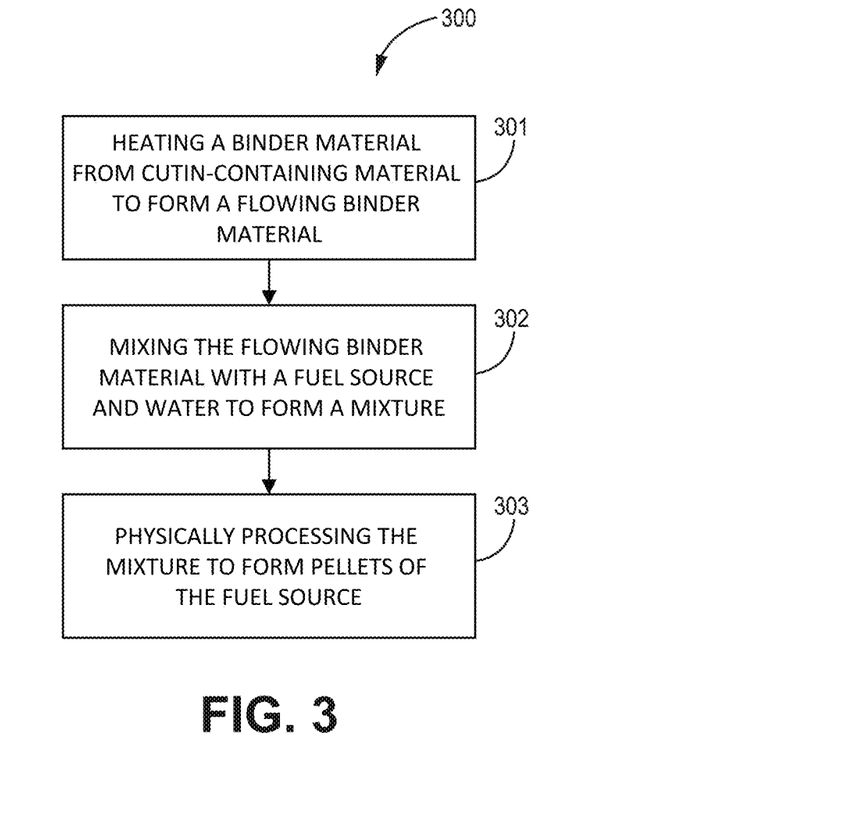
FIG. 3 is a flowchart of a method of forming pellets of a fuel source, according to one or more embodiments of the present disclosure.

In certain embodiments, the methods described above are used to pelletize the fuel source, or a pelletized fuel source. For example, FIG. 3 is a flowchart of a method of forming pellets of a fuel source, according to one or more embodiments of the present disclosure. As shown in FIG. 3, the method may comprise heating 301 a binder material from a cutin-containing material to form a flowing binder material, mixing 302 the flowing binder material with a fuel source and water to form a mixture, and physically processing 303 the mixture to form pellets of the fuel source.

The step 301 includes heating a binder material from a cutin-containing material sufficient to form a flowing binder material. In some embodiments, the binder material is heated at or to a temperature sufficient for a viscosity of the binder material to be reduced. In some embodiments, as the viscosity of the binder material is reduced, the binder material melts sufficient for the binder material or at least a portion of the binder material to flow such that it is capable of being poured (e.g., poured in with the fuel source). In some embodiments, a hot plate is used to heat the binder material. In other embodiments, the binder material is heated using other than a hot plate, such as industrial-scale heating equipment, without departing from the principles of the present invention.

The step of 302 includes mixing the flowing binder material with the fuel source and water to form a mixture with a desired moisture content. In some embodiments, the mixing includes various forms of contacting, such as pouring and adding. For example, in some embodiments, the flowing binder material from step 301 is poured in with a mixture of the fuel source and water. In some embodiments, the fuel source and water are contacted to form a mixture and subsequently the flowing binder material is poured in with the mixture. In some embodiments, upon the contacting and/or pouring of the binder material, the mixture of binder material, fuel source, and water is mixed or immediately mixed. In some embodiments, a Hobart machine or other suitable devices known in the art are used for the mixing.

In some embodiments, the mixture includes about 2% to about 20% binder material, and about 80% to about 98% fuel source. In some embodiments, the mixture includes about 10% binder material and about 90% fuel source. In some embodiments, water is added to form a mixture with the desired moisture content. For example, in some embodiments, the amount of water added to the mixture includes an amount sufficient to provide a mixture, before pelletizing, with a moisture content in the range of about 5% to about 25%. For example, in some embodiments, the moisture content is about 10% (e.g., on a wet basis).

The step of 303 includes physically processing the mixture to form pellets of the fuel source. In some embodiments, the physically processing proceeds at elevated temperatures and/or pressures. In some embodiments, the physically processing includes compressing. For example, in some embodiments, the physically processing includes extruding or pressing the mixture of binder material, fuel source, and water through a die to form pellets of the fuel source. In certain embodiments, the mixture is placed in a feed hopper attached to a pellet mill and pelletized on a mid-compression die with a pellet exit heat in the range of about 70° C. to about 90° C. In some embodiments, the binder material melts to form, or continues to be, a flowing binder material during the physical processing of the mixture. In some embodiments, the binder material is allowed to cool and reform as a solid after the physically processing, coating and protecting the fuel source. In some embodiments, the coating of the binder material provides water-resistant and durable high-energy pellets of the fuel source.

In certain embodiments, the method of forming pellets comprises heating a binder material from cranberry pomace sufficient to form a flowing binder material; mixing the flowing binder material with torrefied wood and water to form a mixture with a moisture content of about 10%; and physically processing the mixture to form pellets of torrefied wood.

Figure 4:
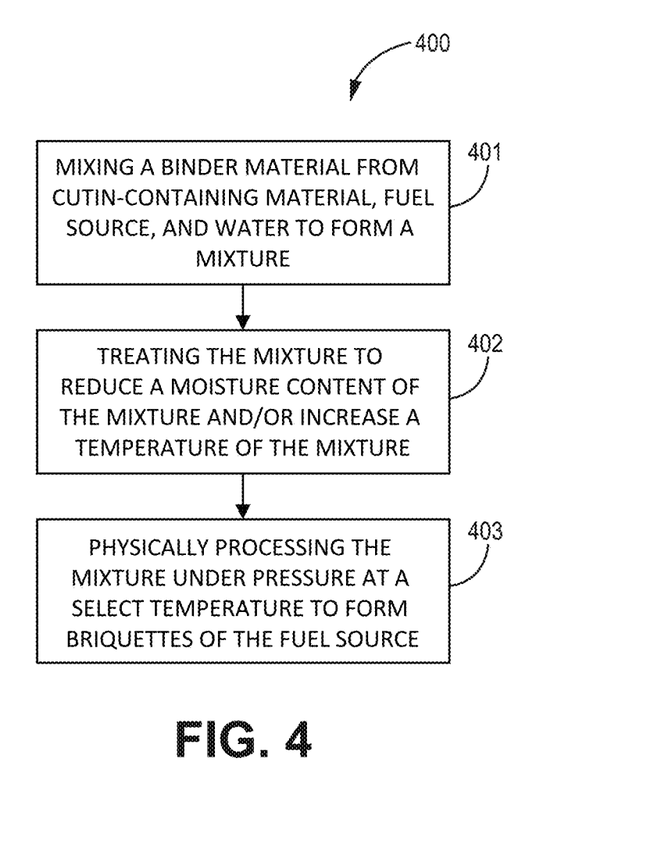
FIG. 4 is a flowchart of a method of forming briquettes of a fuel source, according to one or more embodiments of the present disclosure.

In certain embodiments, the methods described above are used to form briquettes of the fuel source, or a briquetted fuel source. FIG. 4 is a flowchart of a method of forming briquettes of a fuel source, according to one or more embodiments of the present disclosure. As shown in FIG. 4, the method may comprise mixing 401 a binder material form a cutin-containing material, fuel source, and water to form a mixture, treating 402 the mixture to reduce a moisture content of the mixture and/or to increase a temperature of the mixture, and physically processing 403 the mixture under pressure at a select temperature to form briquettes of the fuel source.

The step of 401 includes mixing a binder material from a cutin-containing material, fuel source, and water to form a mixture. In some embodiments, water is mixed with the binder material and fuel source to provide a mixture with a desired moisture content. In some embodiments, the amount of water added to the binder material and torrefied wood includes an amount sufficient to provide a mixture with a moisture content in the range of about 5% to about 25%. In some embodiments, the moisture content of the mixture is about 20% (e.g., on a wet basis). In some embodiments, the mixture includes about 2% to about 20% binder material, and about 80% to about 98% fuel source. In some embodiments, the mixture includes about 10% binder material and about 90% fuel source.

The step of 402 includes treating the mixture to reduce a moisture content of the mixture and/or increase a temperature of the mixture. In some embodiments, the treatment includes heating. For example, in some embodiments, the treating includes heating using a microwave. In some embodiments, the treating includes heating using an oven. In some embodiments, the treating is sufficient to reduce a moisture content of the mixture to less than about 15%. For example, in some embodiments, the moisture content of the mixture is reduced to about 8% to about 12%. In some embodiments, either in addition or in the alternative, the treating is sufficient to increase a temperature of the mixture. For example, in some embodiments, the treating increases a temperature of the mixture to at least about 50° C. In some embodiments, the treating increases a temperature of the mixture in the range of about 70° C. to about 90° C.

The step of 403 includes physically processing the mixture under pressure at a select temperature to form briquettes of the fuel source. In some embodiments, the mixture is formed into briquettes under pressure and at temperatures suitable for a cold-pressed briquetting process or a hot-pressed briquetting process. For example, in some embodiments, the physical processing proceeds under a pressure of about 4200 psig or 14,793 psi. In some embodiments, the physically processing proceeds under conditions suitable for a cold-pressed briquetting process. For example, in some embodiments, the select temperature is less than about 35° C. In some embodiments, the select temperature is in the range of about 20° C. to about 22° C. In some embodiments, the physically processing proceeds under conditions suitable for a hot-pressed briquetting process. For example, in some embodiments, the select temperature is about 200° C. or greater. In some embodiments, the select temperature is about 260° C. In general, the physically processing proceeds for a duration sufficient to form the briquettes. For example, in some embodiments, the physically processing proceeds for a duration of about 30 s. In other embodiments, the duration of the physically processing is less than about 30 s and/or greater than about 30 s.

In some embodiments, the briquettes of the fuel source include about 2% to about 20% of binder material and about 80% to about 98% fuel source. In some embodiments, the briquettes of the fuel source include about 5% binder material and about 95% fuel source. In some embodiments, the briquettes of the fuel source include about 20% binder material and about 80% fuel source.

In certain embodiments, the method comprises mixing a binder material from cranberry pomace, torrefied wood, and water to form a mixture with a moisture content of about 20%; treating the mixture to reduce a moisture content of the mixture to less than about 15%; and physically processing the treated mixture under pressure at a select temperature to form briquettes of torrefied wood.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The following Examples are intended to illustrate the above invention and should not be construed as to narrow its scope. One skilled in the art will readily recognize that the Examiners suggest many other ways in which the invention could be practiced. It should be understood that numerous variations and modifications may be made while remaining within the scope of the invention.

Example 1

Preparing Binder Material from Cranberry Pomace

The Example describes procedures for producing high-energy water-resistant pellets having at least 90% torrefied wood and binder materials comprising from about 5% to about 20% by total weight of the pellets or briquettes. The starting materials included torrefied wood with a moisture content below about 15%, with the equilibrium water content being about 10% to about 15% water. The binder materials are green, bio-based materials for torrefied wood pelletizing and briquetting that were produced from abundant biomass waste materials, containing suberinic and/or cutin fatty acids.

The binder materials described herein alleviated the disadvantages of conventional torrefied wood pellets and briquettes, which suffer from poor water repellency and are not durable, among other things. The binder materials described herein were suitable for forming energy pellets or briquettes. In particular, the binder materials melted and flowed under the extruder conditions of elevated temperature and/or pressure. As the pellets or briquettes moved from the extruder and cool, the binder material reformed as a solid, coating and protecting the smaller particles of torrefied wood, for example.

Figure 5:
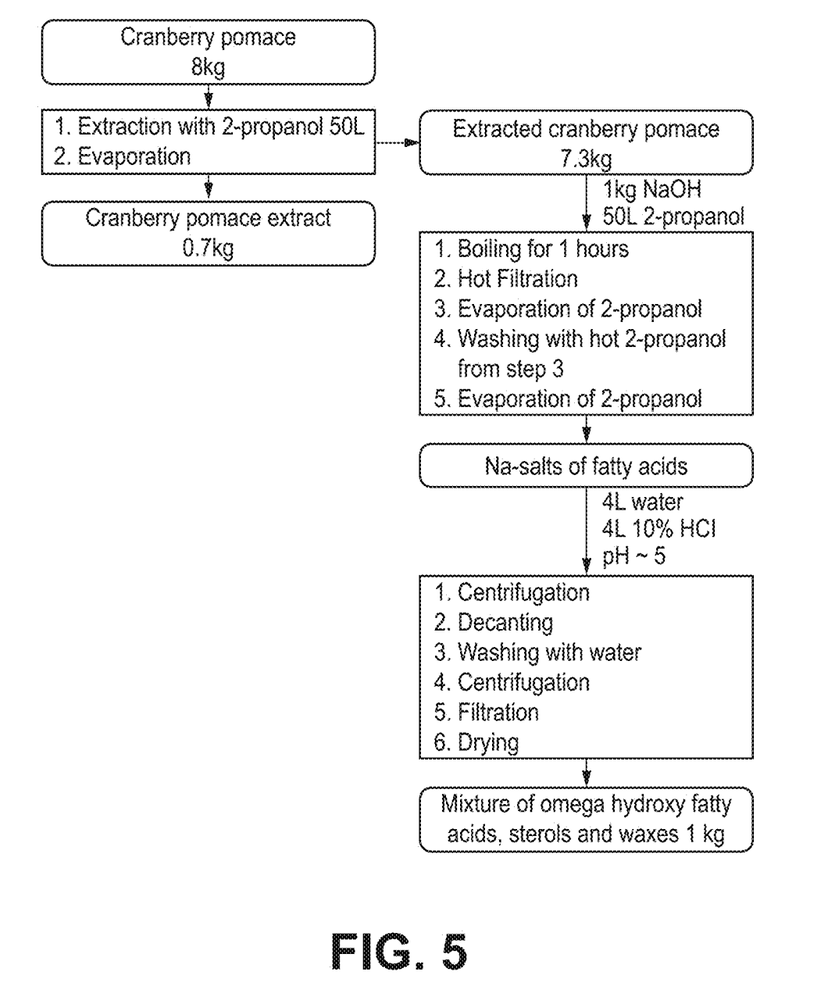
FIG. 5 is a flowchart of a method of isolating an omega-hydroxy fatty acids, sterols, and waxes mixture from cranberry pomace, according to one or more embodiments of the present disclosure.

The binder materials described herein included a mixture of completely natural compounds extracted or obtained from cranberry pomace. A pathway for producing the binder materials included alkali hydrolysis of cranberry pomace, followed by isolation of an omega-hydroxy fatty acids mixture from raw material by acidification to a pH of about 4 to about 5 to obtain a mixture rich in 9,10,18-trihydroxyoctadecanoic acid (e.g., phloionolic acid). See FIG. 5, for example, which is a flowchart of a method of isolating an omega-hydroxy fatty acids, sterols, and waxes mixture from cranberry pomace, according to one or more embodiments of the present disclosure. As shown in FIG. 5, the method isolates an omega-hydroxy fatty acids, sterols, and waxes mixture from cranberry pomace.

For solid-liquid extraction, the cranberry pomace was washed with an organic solvent, preferably 2-propanol, in a proportion of pomace/organic solvent between about 1/5 to about 1/10 weight/volume and a temperature between about 60° C. to about 83° C. The extraction proceeded for a period between about 1 to about 2 h, where 2-propanol was used as the solvent. The following was applicable to clarification by hot filtration of the extract and followed by concentration of the clarified by vacuum evaporation of the solvent (T<80° C.) to obtain a first crude extract volume of between about 8% to about 12% of the volume of initial mash.

Cranberry pomace obtained after extraction was added to a solution of NaOH in a proportion of pomace/NaOH between about 6/1 to about 15/1 weight/volume in the organic solvent, which was preferably 95% 2-propanol, in a proportion pomace/organic solvent between about 1/5 to about 1/10 weight/volume and a temperature between about 60° C. to about 83° C. The reaction proceeded for a period between about 1 to about 3 h, where 2-propanol was used as the solvent. After hot filtration, the organic solvent, preferably 95% 2-propanol, in a proportion pomace/organic solvent between about 1/5 to about 1/10 weight/volume was added to the cranberry pomace, and the mixture was refluxed for a period between about 0.2-1 hour. The following was applicable to clarification by hot filtration of the extract and followed by concentration of the clarified by vacuum evaporation of the solvent (T<80° C.) to obtain a second crude extract of fatty acids sodium salts. Water was added to the solids after evaporation and the mixture was stirred for about 30 min at about room temperature. The water solution was acidified with 10% HCl to a pH of about 4-5 and the precipitates were obtained by centrifugation. Crude precipitates were washed with water, filtered off and dried to obtain a final mixture of omega-hydroxy acids, sterols and waxes volume of between about 5% to about 15% the volume of initial mesh.

The 2-propanol used in the extraction of cranberry pomace and isolation of fatty acids mixture were recycled by evaporation and/or distillation with a recovery rate of about 90%. Only comparatively small quantities of solvent were used for make-up and were effectively consumed in each batch of extraction and fatty acids isolation processes.

Test Procedures and Materials

Physical properties of the torrefied pellets and briquettes were determined with regard to mechanical durability. Climate tests included moisture resistance and rain exposure performed under laboratory conditions. Standard test procedures were used when available. The mechanical durability of a densified fuel provided an indication of the fuel's ability to retain its form during transport and handling processes without going to pieces. Durability was measured according to existing standards (EN 15210-1) applicable for fuel pellets. The durability value provided the mass proportion of the sample that remained intact after the removal of fine broken pieces (fines which passed through a 3.15 mm sieve). For conventional wood pellets, the minimum normative durability classification is equal to or greater than 97.5%.

To assess the outdoor storage properties of the torrefied wood pellets, rain exposure and water immersion tests were conducted on pellet samples. The rain exposure text was performed as follows: a 1 kg sample of pellets was placed on a 450 mm diameter Retsch 3.15 mm sieve. This amount was sufficient to cover the entire bottom of the sieve with one layer of pellets. The sieve was placed over a container. Simulated rainfall was realized through the use of a spray bottle fitted with fine nozzles. In total, 400 g of water was sprayed over each sample for a one-hour period. Runoff water from the pellets drained through the sieve and was collected in the container beneath. The mass of water not absorbed by the pellets could then be determined. The total amount of water corresponds to rainfall of 2.5 mm per hour—a level of rainfall which statistically occurs in Finland once every decade. This level of rain was predefined beforehand by experimentation. The pellets were also subjected to a water immersion test. A 500 g sample of each pellet type was placed in a filtration bag which was then submerged for a period of 15 minutes in a five-liter container of water. By weighing the quantity of water after the immersion period, the amount of water absorbed by the pellet sample could be identified. The immersion time was fixed by pretesting.

Example 2

Preparation of Binder Material from Cranberry Pomace

Figure 6:
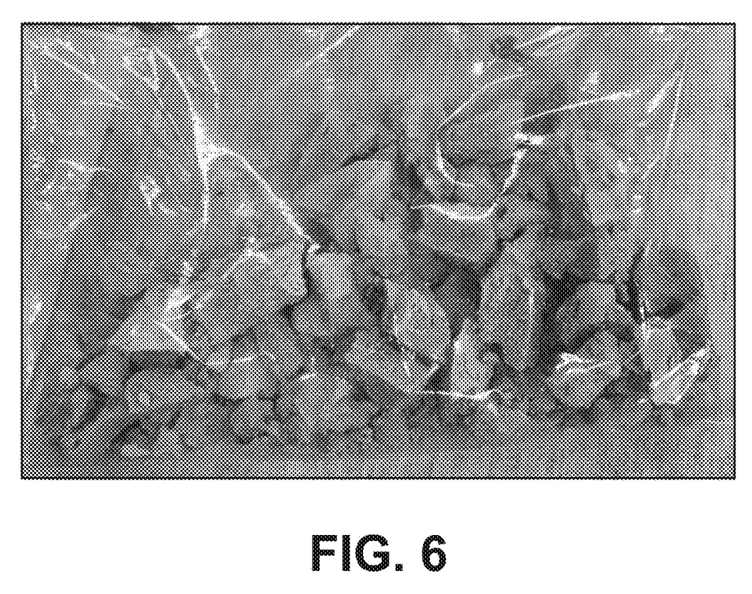
FIG. 6 is an image of binder material from cranberry pomace including omega-hydroxy fatty acids, sterols, and waxes mixture, according to one or more embodiments of the present disclosure.

Dried cranberry pomace was obtained. 8 kg of cranberry pomace was extracted with hot 2-propanol 50 L. 7.3 kg of triterpenes free cranberry pomace was added to a solution of NaOH (1 kg) in 95% 2-propanol (30 L) and the mixture was refluxed (1 hour). After hot filtration, 2-propanol (20 L) was added to the cranberry pomace and the mixture was refluxed (30 minutes). The reaction mixture was filtered while hot, and both 2-propanol filtrates were combined and evaporated at rotor evaporator. Water (30 L) was added to the solids, and water solution was acidified with 10% HCl to pH=5. Precipitation solids were centrifuged, washed with water (2×5 L) and dried to provide beige solids 1 kg. See FIG. 5 and FIG. 6.

Example 3

Forming Pellets

About 50 grams of the binder and about 450 grams of dry NBE torrefied wood with ratio of about 10% binder to about 90% dry torrefied wood. Sufficient amount of water was added to torrefied wood so that total mix before pelletizing (binder, torrefied wood, and moisture) has moisture content of about 10% (this moisture content is a wet basis). Binder was placed on hot plate until material loses viscosity and can be poured in with torrefied wood. Binder was poured into the torrefied wood and water mixture and immediately mixed in the Hobart machine for 2 minutes on the High setting. Mixture was placed in the feed hopper attached to the pellet mill, and pelletized on a mid-compression die with a pellet exit heat of around 70-90° C.

Figure 7:
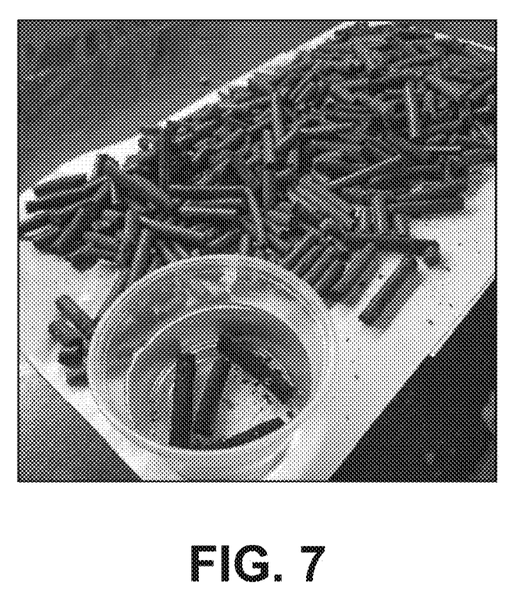
FIG. 7 is an image of pellets produced with about 10% binder and about 90% dry torrefied wood, according to one or more embodiments of the present disclosure.

The composition of the pellets included about 95% torrefied wood and about 5% binder. Another composition of the pellets included about 80% torrefied wood and about 20% binder. The composition of the pellets included about 2% to about 5%, and up to about 20% of binder as specific ratios. See FIG. 7, which is an image of pellets produced with about 10% binder and about 90% dry torrefied wood, according to one or more embodiments of the present disclosure.

Example 4

Forming Briquettes Via a Hot-Pressed Procedure

A sufficient amount of water was added to a mixture of about 20% binder and about 80% torrefied wood to get an about 20% moisture (wet basis), and all mixed for about 5 minutes. About 40 grams of mix was placed into the microwave until the moisture gets lowered to roughly 8-12% and the material is roughly about 70-90° C. Mix was placed into a hot 260° C. (flat briquettes), and compressed at about 4200 psig or about 14,793 psi sample for about 30 seconds. See Table 1. All samples in Table 1 were premixed in a ratio of about 20% of binder and about 80% of syngas steam stripped torrefied black ash.

TABLE 1

| Sample | Cold Pressed Pucks | | Hot Pressed Pucks | |
|---|---|---|---|---|
| | Total MPI (min) | Durability (%) | Total MPI (min) | Durability (%) |
| Cranberry omega hydroxy fatty acids, sterols and waxes mix (phloionolic acid 75%) | 345 | 99.1 | 360 | 93 |

Example 5

Forming Briquettes Via a Cold-Pressed Procedure

A sufficient amount of water was added to a mixture of about 20% binder and about 80% torrefied wood to get an about 20% moisture (wet basis), and all mixed for about 5 minutes. About 40 grams of mix was placed into the microwave until the moisture gets lowered to roughly about 8-12% and the material is roughly about 70-90° C. Mix was placed into a cold 20-22° C. (flat briquettes), and compressed at about 4200 psig or about 14,793 psi sample for about 30 seconds. See Table 1, above.

The composition of the briquettes included about 95% torrefied wood and about 5% binder. Another composition of the pellets included about 80% torrefied wood and about 20% binder. The composition of the pellets included about 2% to about 5%, and up to about 20% of binder as specific ratios.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of making a binder material, comprising:
   contacting a cutin-containing material with a liquid solvent to obtain a first extract, wherein the cutin-containing material sourced from fruits or vegetables;
   separating the cutin-containing material from the first extract;
   contacting the cutin-containing material with an alkali solution to obtain a second extract including salts of one or more omega-hydroxy fatty acids;
   separating the second extract from at least residual alkali, residual liquid solvent, and the cutin-containing material;
   contacting the second extract with water and an acid to form crude precipitates; and
   separating the crude precipitates from at least the water and acid to obtain a binder material, wherein the binder material is a mixture of omega-hydroxy fatty acids, sterols, and waxes.

2. The method of claim 1, wherein the liquid solvent is one or more of methanol, ethanol, 1-propanol, 2-propanol, acetone, chloroform, dichloromethane, xylenes, o-dichlorobenzene (ODCB), dimethylsulfoxide (DMSO), tetrahydrofuran (THF), ethyl acetate, benzene, and dimethylformamide (DMF), wherein the cutin-containing material is contacted with the liquid solvent at a temperature in the range of about 60° C. to about 83° C.

3. The method of claim 1, wherein a proportion of the cutin-containing material/liquid solvent is in the range of about 1/5 to about 1/10 (w/v).

4. The method of claim 1, wherein the alkali solution comprises NaOH and/or KOH in water and one or more of methanol, ethanol, 1-propanol, and 2-propanol.

5. The method of claim 1, wherein a proportion of the cutin-containing material/alkali solution is in the range of about 6/1 to about 15/1 (w/v).

6. The method of claim, 1, wherein the contacting of the second extract with water and an acid includes contacting the second extract with water and subsequently contacting the second extract with HCl to adjust a pH of the solution to a pH of about 3 to about 6.

7. The method of claim 1, wherein the binder material comprises about 15% (w/w) or less of triterpenes.

8. The method of claim 1, wherein the binder material comprises:
   (a) omega-hydroxy fatty acids, wherein the omega-hydroxy fatty acids include phloionolic acid, 9,10-epoxy-18-hydroxyoctadecanoic acid, 18-hydroxyoctadec-9-enoic acid, 16-hydroxyhexadecanoic acid, and 9,10,12,13,18-pentahydroxyoctadecanoic acid;
   (b) sterols, wherein the sterols include sitosterol and schottenol;
   (c) waxes, wherein the waxes include octacosanol, glycerol, methyl palmitate, methyl linoleate, methyl oleate, and methyl hexacosanoate;
   (d) glycerol, methyl linoleate, and methyl oleate; and
   (e) about 5% (w/w) to about 10% (w/w) of triterpenes, wherein the triterpenes include oleanolic acid and ursolic acid.

* * * * *